INVENTOR:
FRED C. SCHWANEKE
BY
ATT'Y

United States Patent Office 3,049,922
Patented Aug. 21, 1962

3,049,922
COFFEE MAKER VISUAL INDICATOR
Fred C. Schwaneke, Chicago, Ill., assignor, by mesne assignments, to Webcor, Inc., a corporation of Illinois
Filed Sept. 6, 1960, Ser. No. 54,149
1 Claim. (Cl. 73—323)

This invention relates generally to coffee makers and more particularly to a visual indicating device for determining the exact amount of liquid within a coffee maker.

In conventional household coffee makers it has been necessary to mark or score the internal surface of the coffee maker well to provide a means for indication of the level of the liquid therein. Knowledge of the exact amount of liquid within the coffee well is especially important when making a coffee brew since the amount of granular coffee material used is ordinarily determined by the number of cups of water within the coffee maker. When an attempt is made to fill the conventional coffee maker to a certain marked level, indicating a certain number of cups of water, it is frequently necessary to add water several times since the coffee maker must be periodically removed from under a water source to see exactly how far the coffee maker has been filled. In other words, filling the conventional coffee maker with water is accomplished by a trial and error method until the desired level of liquid is attained.

Moreover, after the coffee brew has been made it is even more desirable to know exactly how much coffee brew is left within the well. Again, in the conventional coffee maker it is necessary to remove the lid and try to determine the liquid level by the lines of the inner surface of the well. To those who have tried to determine how many cups of coffee brew there are in a coffee well, after some of the coffee has been removed, have experienced the difficulties one has since the majority of coffee wells are of metallic material and when combined with the naturally dark color of the liquid therein makes the viewing of the internal level lines extremely difficult and often requires the tipping of the coffee maker so that light may enter its top to permit observation of these level lines. Naturally, the tipping of the coffee maker to permit light to enter will provide a false reading and hence the viewer must hazard a guess as to the exact amount of liquid within the well.

Furthermore, the internal level indicating lines formed into the metal of the conventional coffee maker provide enough of a recess in the ordinarily smooth interior of the well, to permit collection or deposit of coffee therein if careful cleaning of the interior is not accomplished after each usage.

This further hinders observation of these lines and also provides an unsanitary condition. It is therefore, the primary object of this invention to provide an improved liquid level indicating device which will eliminate the disadvantages of the prior art and provides a visual indicating device on the exterior surface of a coffee maker.

A specific object of this invention is to provide an improved indicating device that is mounted in the handle of a coffee maker whereby the exact liquid level within the coffee maker is readily ascertainable.

Another object of this invention is to provide an improved indicating device that permits an external visual representation of the exact number of cups of liquid within the well of a coffee maker.

A further object of this invention is to provide an improved indicating device that is recessed within the handle of the coffee maker whereby the upper surface of the indicating device is of the same elevation as the surface of the handle.

A still further object of this invention is to provide an improved indicating device which has a calibrated readout behind a column of liquid within a tube.

Another object of this invention is to provide a calibrated readout having a smooth angular contour behind a column of liquid whereby the numerals are readily visible and greatly magnified.

A still further object of this invention is to provide an improved visual indicating mechanism for coffee makers which permits ready access for cleaning of a smooth interior surface of a tube with a calibrated readout adjacent to but not in contact with the liquid.

With these objects and other features and advantages of the invention in mind, which will appear from the following description and claims in conjunction with the drawings, the invention consists in the novel construction, arrangement and the formation of the parts.

In brief, the invention consists of a hollow tube, curved to conform to the general contour of a coffee maker handle, with a calibrated readout designed to contact a portion of the external surface of the tube. The readout and tube are recessed in the center of the handle with the lower end of the tube passing through and being securely sealed in the coffee maker well while the upper end of the tube is open to atmosphere. It is readily apparent that the level of the liquid within the well will be the exact same height within the hollow tube. The upper end of the tube, which is open to the atmosphere, permits ready accessibility for the cleaning of the tube. The close proximity of the readout to the tube plus the liquid within the tube provides an amplification of the numerals on the readout which further facilitates the determination of the exact number of cups of liquid within the well.

So that the present invention may be more clearly presented and more easily understood, the applicant now refers to the drawings in which.

Figure 1:
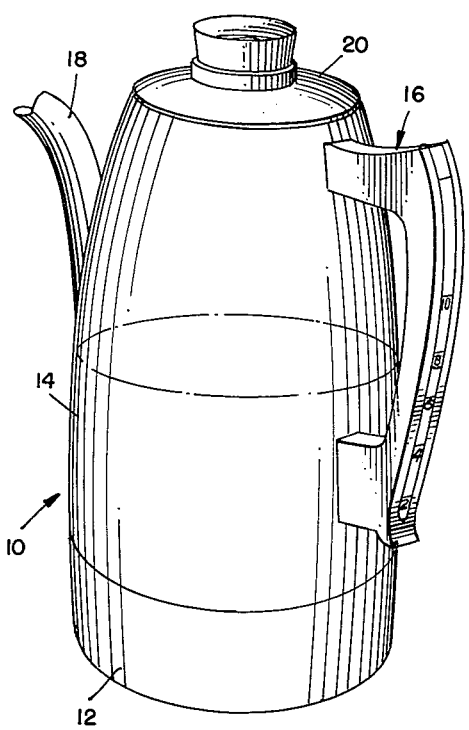
FIG. 1 is a perspective view of a coffee maker illustrating the visual indicating device of this invention in a handle mounted thereon.

Referring now to FIG. 1, a coffee maker, to which this invention applies, is indicated by the numeral 10 and comprises a lower heating section 12, a well section 14, a handle section 16, a spout 18 and a lid 20.

Figure 2:
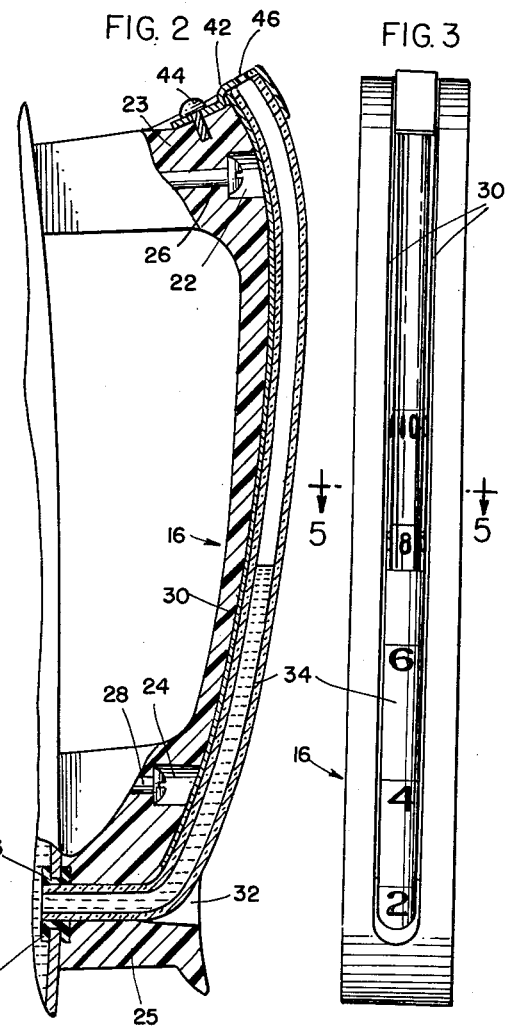
FIG. 2 is a fragmentary, partially sectioned view in side elevation of the handle of the coffee maker shown in FIG. 1, illustrating the relationship of the parts of the indicating device of this invention.
Figure 5:
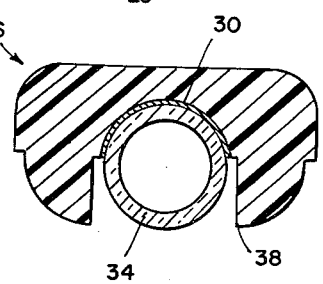
FIG. 5 is a cross sectional view taken along the line 5—5 of FIG. 3.

Referring specifically to FIGS. 2 and 5, the handle section 16, in which the indicating mechanism of this invention is mounted, is preferably formed from a dark colored heat resistant plastic material and is so contoured for ready gripping and holding by the hand. Recessed openings 22 and 24, adjacent an upper end 23 and a lower end 26 of the handle respectively, provide a seat and passage for securing screws 26 and 28 respectively for securing the handle to the coffee maker. A curved groove 30 is centrally formed in the handle which extends from its uppermost end 23 to a point adjacent the lower end 25, terminating in an opening 32 which is in alignment with an opening 33 in the side wall of the well section 14.

A hollow tube 34, preferably formed from a clear, heat resistant plastic material, is curved to conform to the contour of the handle 16 and to be mounted in the groove 30 whereby an outermost surface 36 of the tube 34 will be at the same elevation as an outer surface 38 of the handle 16. The tube extends from the uppermost end 23 of the handle to the lower end 25, terminating in and passing through the opening 32 and the opening 33 to be sealed in the side of the well section 14. A sealing member 40, preferably of a resilient material such as rubber or a heat resistant plastic, provides a leak-proof seal about the end of the tube 34 between the tube and the side wall of the well section 14. The clamping force induced by the sealing member 40 also provides a clamping or holding means for securing the lower end of the tube 34 in position against the handle and to the coffee maker. The upper portion of the tube is retained in the groove 30 by an angular securing clip 42 which is detachably secured to the top of the handle by a screw member 44. The clip 42 provides an opening 46 in alignment with the end of the tube 34 to permit access to the tube for cleaning and to permit the tube to be open to atmospheric pressure.

Figure 3:
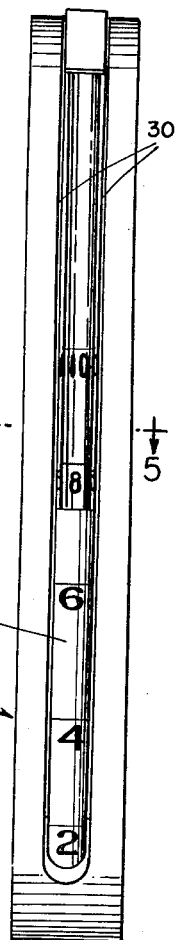
FIG. 3 is an end view of a coffee maker handle with the indicating devices of this invention mounted therein, illustrating the magnification of the numerals of a readout behind the liquid as viewed by a user.

A calibrated readout 48 is contoured to nest between the groove 30 and the back side of the tube 34 when the tube is secured to the handle 16 and is preferably formed from a thin flexible metal having a silver colored surface on one side with black lines and numerals applied thereon. It is readily apparent, that the spacing between the lines on the face of the readout will vary, depending upon the internal contour of the coffee maker well which of course determines the actual amount of liquid that the coffee maker can accommodate. As best seen in FIG. 3, the numerals, indicating the number of cups of liquid within the coffee maker well, are positioned below their corresponding horizontal lines.

Figure 4:
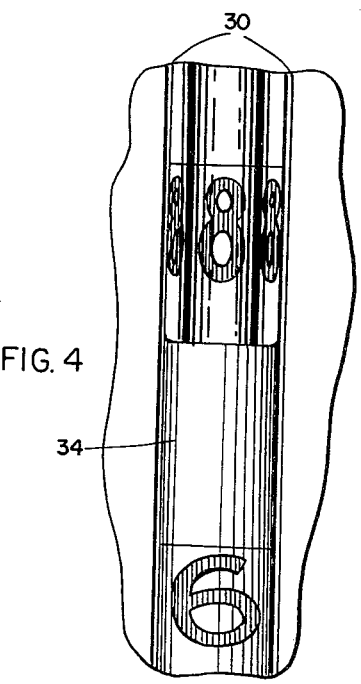
FIG. 4 is an enlarged fragmentary end view of a coffee maker handle with the indicating device of this invention mounted therein.

Referring now specifically to FIGS. 3 and 4, it is readily seen that with the readout behind the tube 34, the viewer may readily determine the amount of liquid within the coffee maker well by comparing the miscus of the liquid within the tube with one of the horizontal lines of the readout. A unique feature of this arrangement of the indicating device is readily seen in FIG. 4, namely, that when viewing the readout through the tube without liquid therein, there is a side angular reflection through the tube giving the appearance of three images of the indicating numeral, but when viewing the readout through the tube having liquid therein there appears only one image of the numeral which is greatly amplified which greatly aids the viewer in reading the numbers in determining the exact amount of liquid within the well.

To those skilled in the art it is readily apparent that the construction, arrangement and structure of the parts of this invention provides an improved externally mounted visual indicating device which readily permits the determination of the exact amount of liquid within a coffee maker. Furthermore, it provides an indicating means which is readily accessible to permit the cleaning of the device after the coffee has been used.

It is realized that the actual details of the construction and arrangement of the several component parts may be readily modified by one skilled in the art, and the inventor only intends to be limited to a reasonable interpretation of the appended claim covering the construction as illustrated and described.

What is claimed is:

A visual indicating device adapted to a coffee maker for representation of the amount of liquid within a well comprising a contoured handle, screw members recessed in the handle to secure it to the coffee maker, a contoured groove formed in the handle, said groove substantially extending the length of the handle, a curved flow tube formed from a clear plastic material, a calibrated metallic readout, said readout and said tube disposed in said groove, an upper end of said tube open to atmospheric pressure, a lower end of said tube extending through said handle into said coffee well, means to secure said lower end to the well in leakproof relationship, and means to secure the upper end of the tube to the handle including an angular clip member secured to an upper surface of the handle and provides an opening therethrough in alignment with the upper end of the tube when in a secured position.

References Cited in the file of this patent
UNITED STATES PATENTS

| | | |
|---|---|---|
| 745,744 | Uhalt | Dec. 1, 1903 |
| 1,619,919 | Cook | Mar. 8, 1927 |
| 2,847,856 | Mahon | Aug. 19, 1958 |